US00RE45623E

(19) United States
(12) Reissued Patent
Galante et al.

(10) Patent Number: US RE45,623 E
(45) Date of Reissued Patent: Jul. 28, 2015

(54) AUTOMOBILE BODY

(75) Inventors: Vincent J. Galante, Lake Orion, MI (US); Mark T. Allen, Oxford, MI (US); Gregory A. Howell, Farmington, MI (US); Dennis Myles, West Bloomfield, MI (US); Aaron Pizzuti, Beaverton, OR (US)

(73) Assignee: FCA US LLC, Auburn Hills, MI (US)

(21) Appl. No.: 29/411,840

(22) Filed: Jan. 26, 2012

Related U.S. Patent Documents

Reissue of:
(64) Patent No.: Des. 608,693
Issued: Jan. 26, 2010
Appl. No.: 29/334,809
Filed: Apr. 2, 2009

(51) LOC (10) Cl. ..... 12-08
(52) U.S. Cl.
USPC ..... D12/91
(58) Field of Classification Search
USPC ..... D12/86, 90, 91, 92; D21/424, 425, 433, D21/434; 296/181.1, 181.5
See application file for complete search history.

(56) References Cited

U.S. PATENT DOCUMENTS

| | | | | |
|---|---|---|---|---|
| D350,504 | S | | 9/1994 | Nixon |
| D365,785 | S | | 1/1996 | Sawyer |
| D396,828 | S | | 8/1998 | Baccus et al. |
| D418,086 | S | | 12/1999 | Starr et al. |
| D420,939 | S | | 2/2000 | Faurote et al. |
| D479,155 | S | | 9/2003 | Dolan et al. |
| D500,460 | S | | 1/2005 | Allen et al. |
| D522,917 | S | | 6/2006 | Wagner et al. |
| D574,298 | S | * | 8/2008 | Opfer et al. ..... D12/91 |
| D586,697 | S | * | 2/2009 | Nagode et al. ..... D12/91 |
| D588,501 | S | | 3/2009 | Krugger et al. |
| D589,401 | S | * | 3/2009 | Yokoi et al. ..... D12/91 |

* cited by examiner

*Primary Examiner* — Phillip S Hyder
(74) *Attorney, Agent, or Firm* — Ralph E Smith

(57) CLAIM

The ornamental design for an automobile body, as shown and described.

DESCRIPTION

FIG. 1 is a front perspective view of an automobile body showing our new design;
FIG. 2 is a side view thereof;
FIG. 3 is a front view thereof;
FIG. 4 is a rear view thereof; *and,*
FIG. 5 is a rear perspective view thereof[; and,]
[FIG. 6 is a top plan view thereof].
It will be understood that the broken lines presented in the drawings are for illustration only, and do not form a part of the claimed design.

1 Claim, 4 Drawing Sheets

Matter enclosed in heavy brackets [ ] appears in the original patent but forms no part of this reissue; matter printed in italics indicates the additions made by reissue.

AMENDED

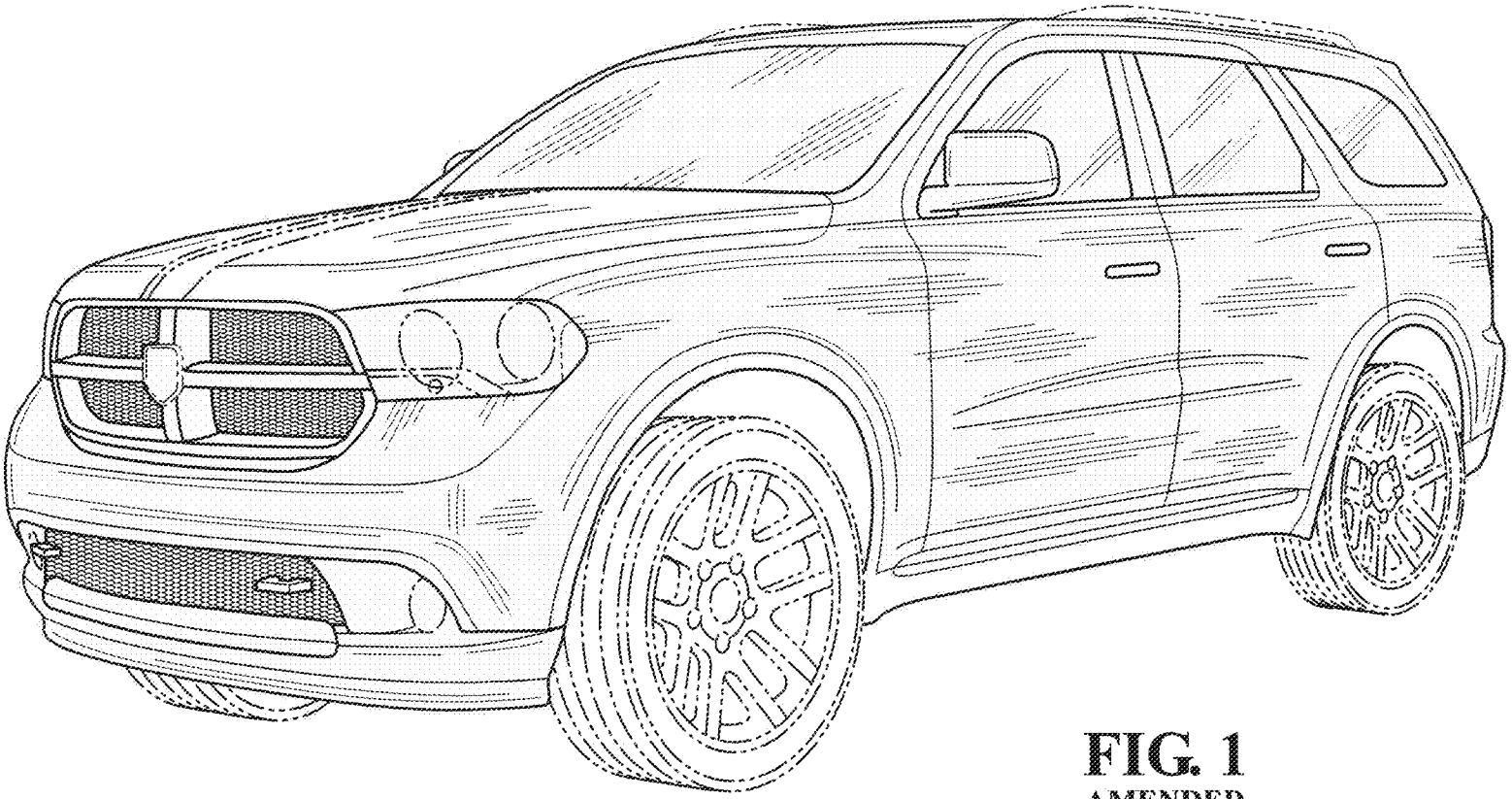
FIG. 1
AMENDED

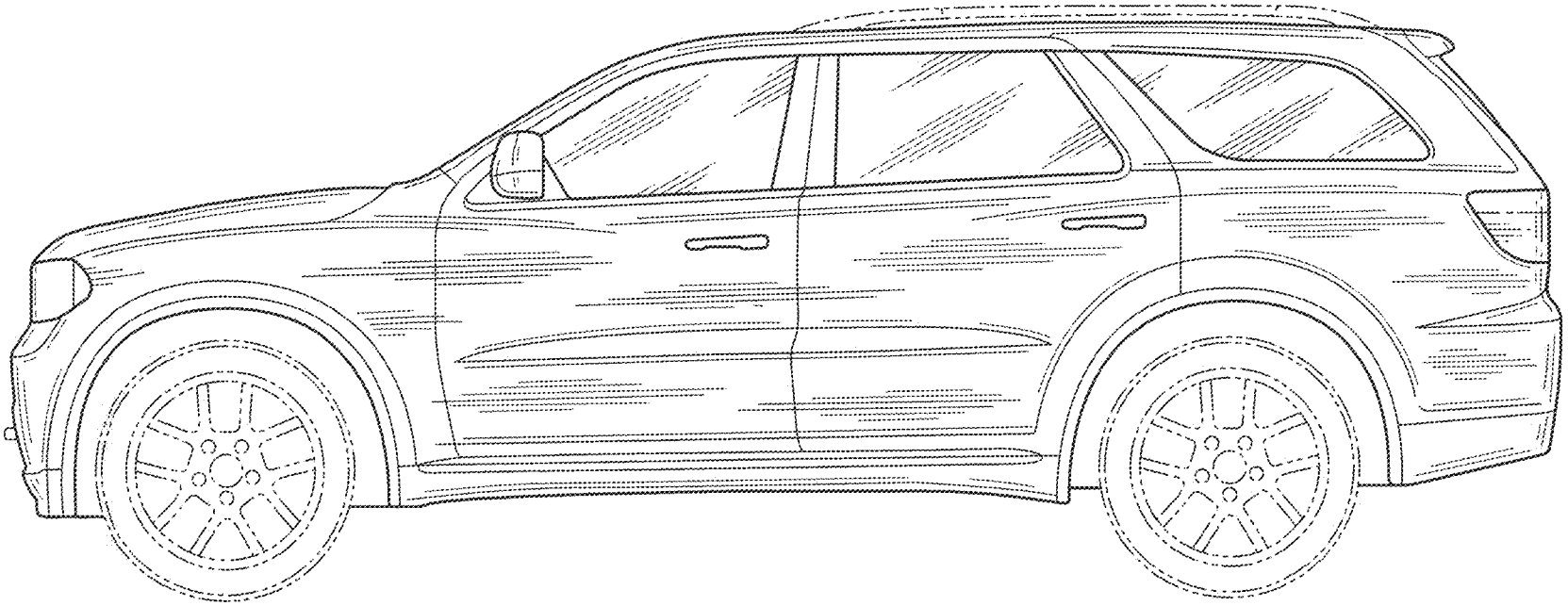
FIG. 2
AMENDED

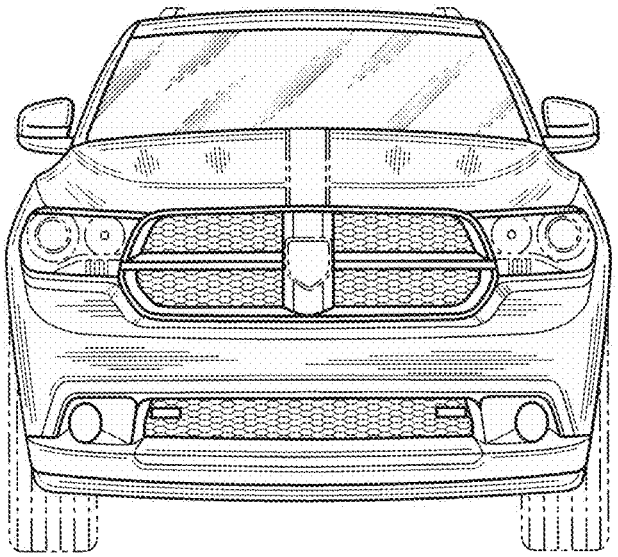
FIG. 3
AMENDED
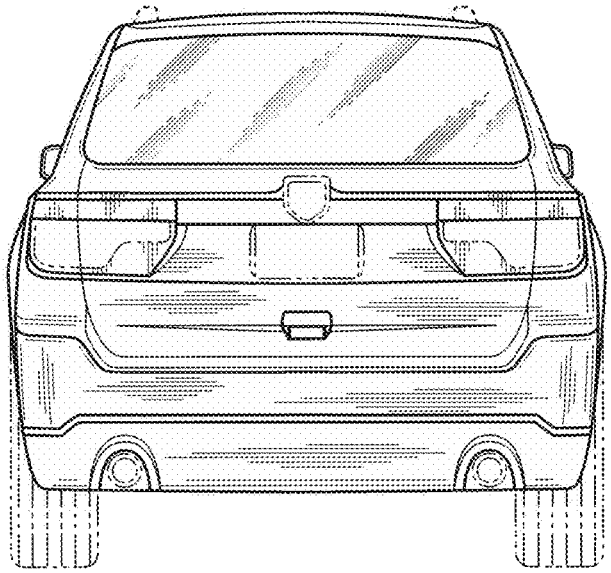
FIG. 4
AMENDED

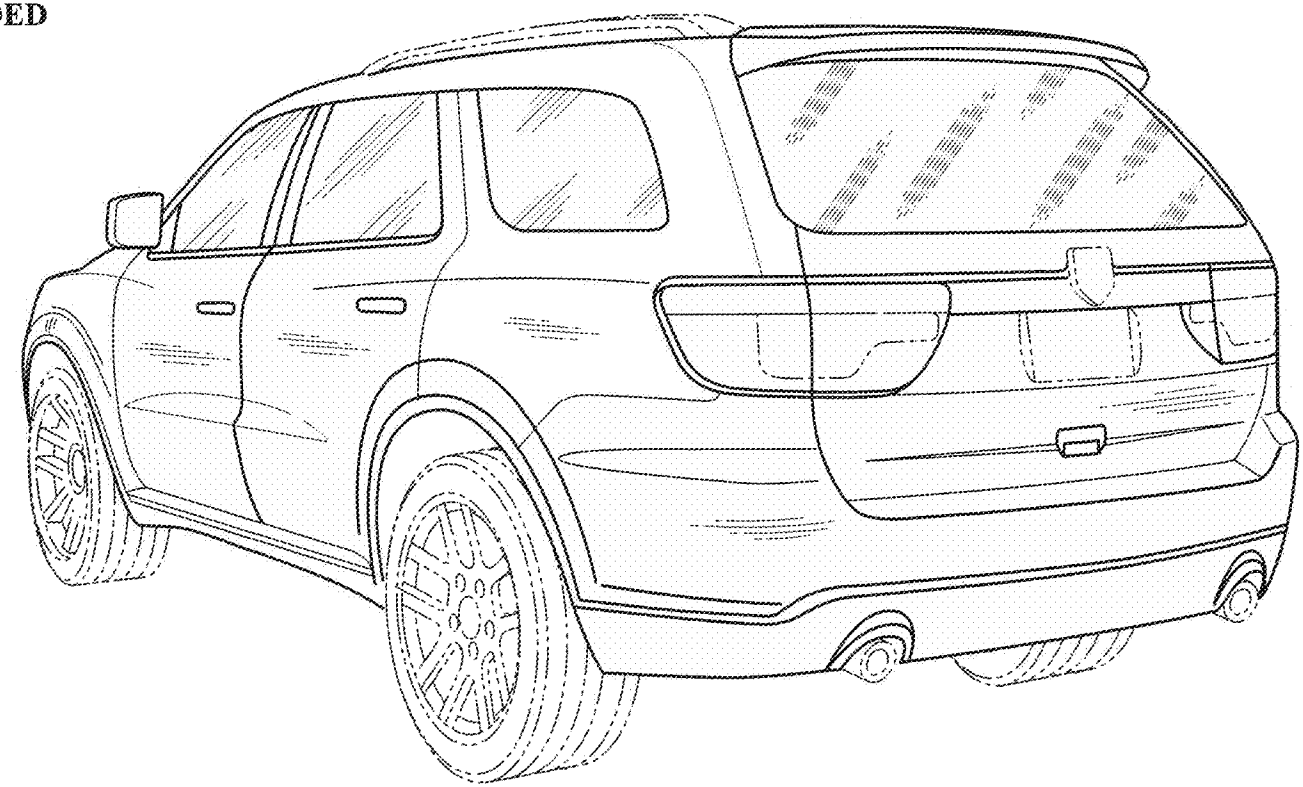
FIG. 5
AMENDED